Oct. 23, 1956     L. V. GRANGER     2,767,760
ANTISKID DEVICE

Filed April 23, 1953     2 Sheets-Sheet 1

INVENTOR.
LOUIS V. GRANGER
BY
Woodling and Krost
attys.

Oct. 23, 1956  L. V. GRANGER  2,767,760
ANTISKID DEVICE
Filed April 23, 1953  2 Sheets-Sheet 2
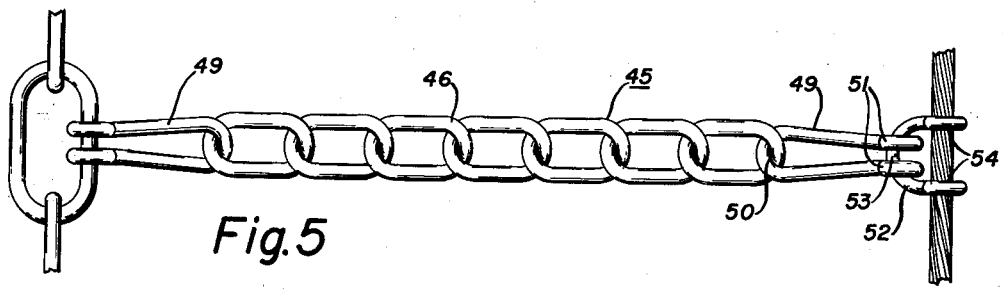
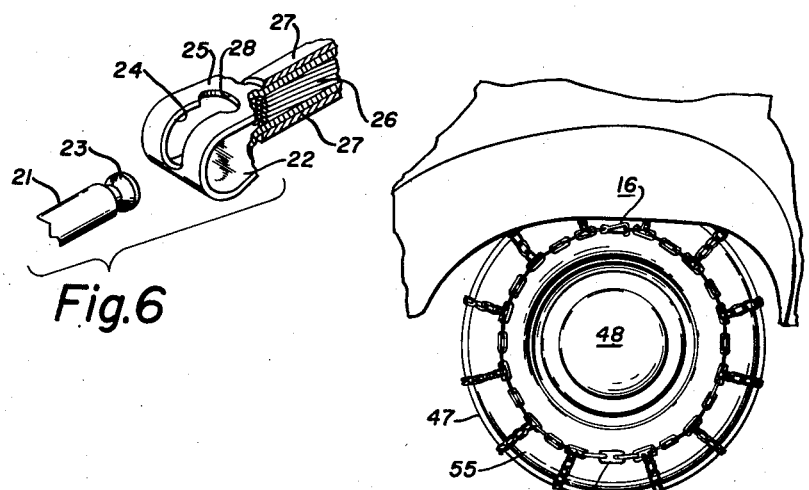
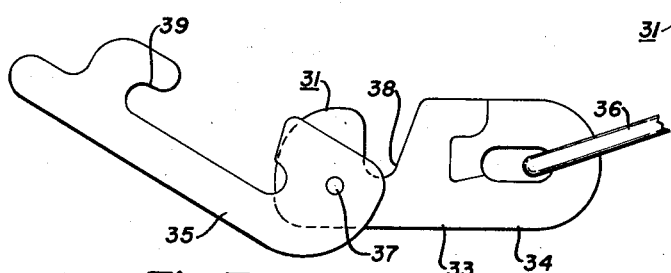
INVENTOR.
LOUIS V. GRANGER
BY
Woodling and Krost,
attys.

United States Patent Office 2,767,760
Patented Oct. 23, 1956

2,767,760

ANTISKID DEVICE

Louis V. Granger, Mayfield Heights, Ohio

Application April 23, 1953, Serial No. 350,639

5 Claims. (Cl. 152—213)

The invention relates in general to antiskid devices and more particularly to antiskid devices or chain assemblies for particular use with a pneumatic tire on a vehicle wheel.

Many types of antiskid devices for vehicle wheels have been made, yet the antiskid device or tire chain still remains in little use because of its difficulty in applying and removing, and many people would prefer to take a chance on getting stuck in mud or snow rather than to take the bother to apply the prior art form of tire chain.

An object of the invention is to provide a tire chain which may be easily placed upon a vehicle wheel without jacking up the vehicle, without moving the vehicle, or without reaching under the fender of the vehicle.

Another object of the invention is to provide an antiskid device that may be readily applied to the wheel of a vehicle and which has sufficient stiffness so that it may be pushed and pulled to straighten out any kinks in the side chain or cross chains thereof.

Another object of the invention is to provide a tire chain which includes a relatively stiff but flexible single wire rope as one annular side member and two separate chains as the other side member such that the chain may be grasped near one end and swung or whipped under the automobile in a manner such that the mid-portion of the wire rope hits the tire under the influence of the whipping action to bring the opposite end of the chain and wire rope into a position available to the hand of the person applying the chain. Further, the stiffness of the wire rope permits pushing, pulling, and wiggling the entire length of the chain to straighten same into position for applying to the wheel of the automobile.

Another object of the invention is to provide an antiskid device for a tire of a vehicle wheel wherein a single flexible wire rope is used as one face member, preferably the inner face member, and two separate chains serially connected are used as the other face member with cross chains extending between the two face members. Further, the cross chains each have end links which are similar with the cross chain end links attaching to the side chains in a loose but positively attached manner and the opposite end links of the cross chains are clamped to the flexible wire rope in a positive clamping engagement which prevents sliding or turning on the cable. Further, the cross chain end link clamped to the wire rope is appreciably lighter than the intermediate links of the cross chains.

Another object of the invention is to provide a tire chain which may be readily applied to a vehicle wheel without jacking up the wheel or vehicle, without moving the vehicle, or without reaching appreciably under the vehicle and wherein the chain comprises a single flexible, yet stiff, wire rope of one piece non-adjustable length as the inner face member, and the outer face member comprises two chains serially connected by connecting hooks, only one of which is adjustable. The chain may be taken by one end and slung underneath the automobile with the wire rope contacting the inner face of the tire with sufficient force to cause the inertia of the tire chain to bring the other end thereof out from underneath the automobile on the other side of the wheel. The outer side chains may then be connected at the non-adjustable coupling, the entire chain lifted up by the cables until above the center of the wheel, the two ends of the cable may then be non-adjustably connected and the stiffness of the cable permits the inner face member, which is the cable, to be easily moved upwardly and inwardly by pushing or tossing into a position against the inner side wall of the tire. Next, the lower outer ends of the side chains may be adjustably connected to complete the installation upon the vehicle wheel.

Another object of the invention is to provide a tire chain having two connectors in one side member and only a single connector in the other side member for a total of three connectors, which tire chain may be applied to the vehicle wheel with a minimum of time, complexity, and dependence upon memory to determine which connectors should be connected or unconnected at various stages of the installation.

Another object of the invention is to provide a tire chain having two serially connected chains comprising an outer face member and having an inner face member of which at least the central portion is a relatively stiff wire rope.

Other objects and a fuller understanding of this invention may be had by referring to the following description and claims, taken in conjunction with the accompanying drawings, in which:

Figure 1 shows a plan view of a tire chain according to the invention;

Figures 2, 3, and 4 show progressive steps in applying the chain to the wheel;

Figure 5 shows an enlarged view of the cross chain connecting the two face members;

Figure 6 shows an enlarged view of the cable coupling; and

Figure 7 shows an enlarged view of one of the chain couplings.

Figure 1:
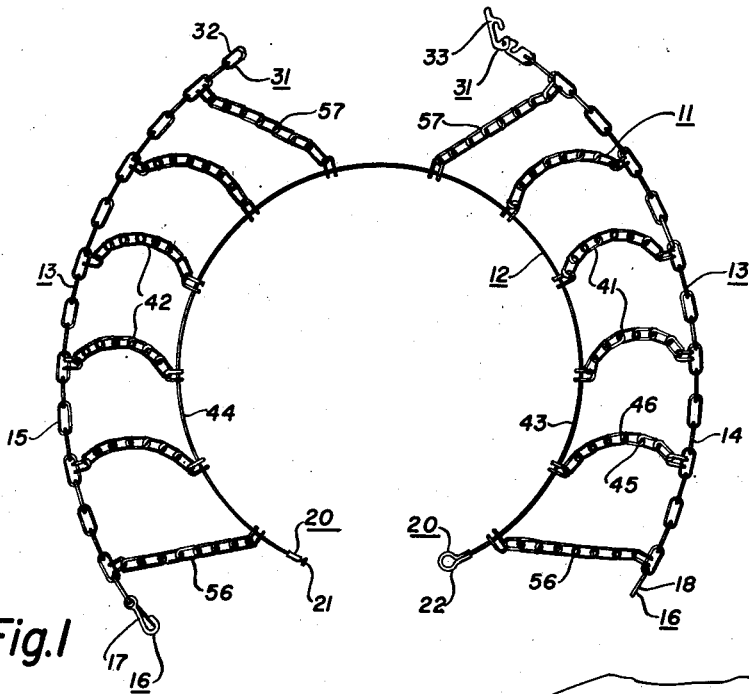

The Figure 1 shows generally the complete chain assembly 11 which includes an inner face member 12 and an outer face member 13. The inner face member 12 consists of a single piece of wire rope which is relatively stiff yet has the flexible characteristics of wire rope or cable. The outer face member 13 includes first and second face chains 14 and 15. These face chains 14 and 15 are articulate members formed from link chain. Three couplings are provided in the chain assembly 11. A first coupling 16 is a simple and easily operated coupling comprising a snap hook 17 and an eye or ring 18. The snap hook 17 is provided on one end of the face chain 14 and the ring 18 is provided on one end of the face chain 15. A second coupling 20 is provided at the ends of the inner face member 12. This second coupling 20 includes a hook member 21 and an eye member 22. The hook member 21 includes a coaxial head 23 which is receivable in a slot 24 in the eye member 22. The eye member 22 consists of a metal plate 25 which is bent around and clamped to the end 26 of the cable 12. Clamping rings 27 extend around the metal plate 25 to clamp this plate 25 to the cable 12. The slot 24 has an enlarged opening 28 at one side to permit entry of the head 23. The second coupling 20 is thus quickly and easily assembled and is so constructed so as to permit relative rotation between the hook member 21 and the eye member 22.

A third coupling 31 connects the other ends of the face chains 14 and 15. This third coupling 31 includes a ring 32 which may merely be the end link of the face chain 15. The third coupling 31 also includes a hook member 33 on the end of the face chain 14. This hook member 33 includes first and second pivoted plates 34 and 35. The first pivoted plate 34 is connected to the end link 36 of the face chain 14. The second pivoted plate 35 is connected to the first pivoted plate 34 by a hinge pin 37 and is adapted to be swung through approximately a one hundred eighty degree arc to receive the ring 32 in the recess 38 and with a hook 39 engaged by the end link 36.

A first group of cross chains 41 interconnects the face chain 14 and a first portion 43 of the inner face member 12. A second group of cross chains 42 interconnects the face chain 15 and a second portion 44 of the inner face member 12. The first and second groups of cross chains 41 and 42 each include individual cross chains 45. Preferably, the cross chains include twisted links 46 which bridge the tread portion 47 of a wheel 48. Identical end links 49 are provided at each end of the cross chains 45. These end links 49 are flat rather than twisted and include a U-shaped center portion 50 and two U-shaped end portions 51. The U-shaped end portions 51 are loosely yet positively connected to a cable connecting link 52 at the cable end of each cross chain. This cable connecting link 52 includes a U-shaped center portion 53 and two U-shaped end portions 54 which positively and fixedly clamp to the cable 12. The end U-shaped portions 54 are forced tightly into engagement with the cable 12 so that they are fixedly attached thereto both for rotational and longitudinal movement, and hence, do not slide on the cable 12. The cable connecting links 52 are smaller than and have less mass than the end links 49, and thus provide a connection which is small, trim, and has no bulky protuberances.

The couplings 16 and 20 are adjacent and are provided between the same pair of cross chains 56. The coupling 31 is generally diametrically opposite the coupling 16 and is provided between the pair of cross chains 57.

Figure 2:
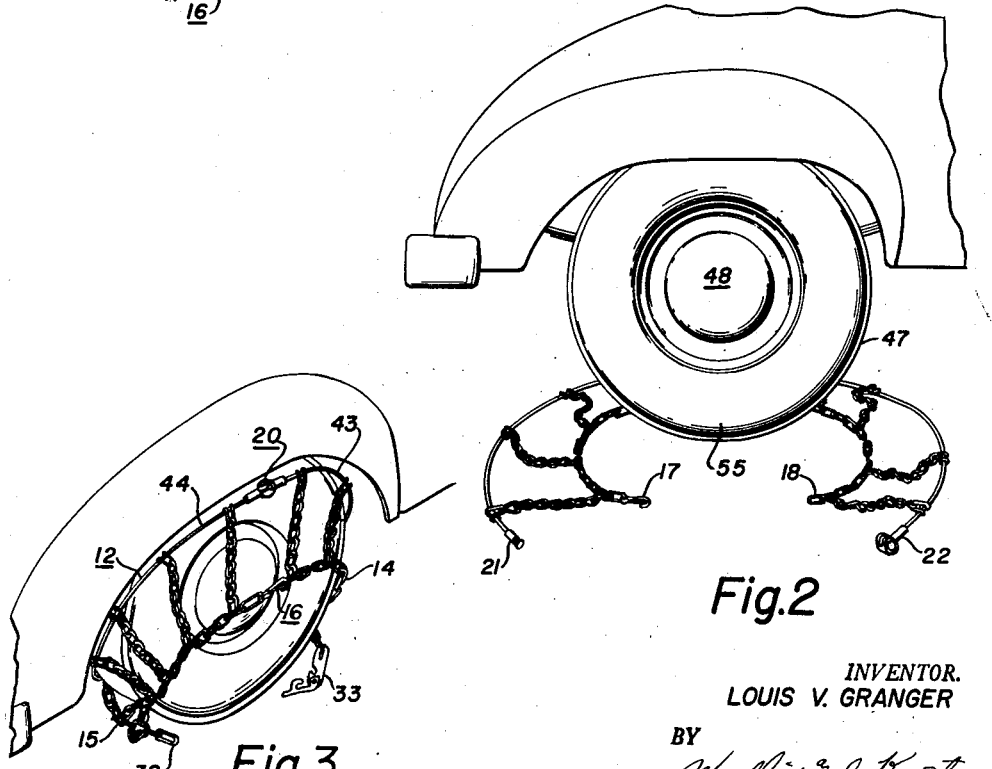
Figure 3:
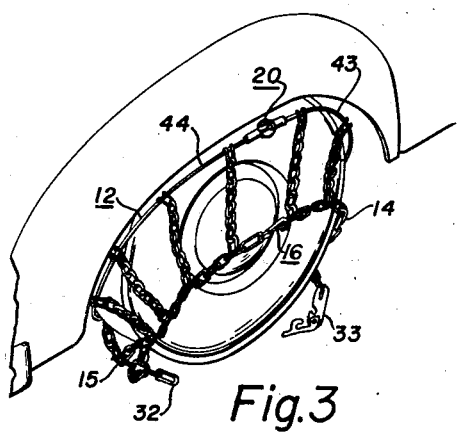

The method of applying the tire chain 11 to a wheel 48 is shown in Figures 2, 3, and 4. The operator first sees that all couplings 16, 20, and 31 are unfastened. He next stations himself adjacent and in front of the wheel 48 on which he wishes to apply the tire chain 11. He grasps one end of the chain; for example, grasping both the face chain 14 and the portion 43 of the cable 12 in one hand. He next swings the chain in a whip-like motion generally horizontal to sling the other end of the tire chain 11 around behind the wheel 48. The center of the face member 12, since it is relatively stiff cable, strikes the inner side wall of the tire 55. This brings to the front of the wheel the end of the tire chain 11 on which are carried the hook members 17 and 21. Because of the relatively stiff wire cable 12, the operator may push and pull and likewise maneuver this cable 12 to quickly untangle any kinks or twists in the tire chain assembly 11, which will then generally be in the position shown in the Figure 2. The operator next will fasten the chain coupling 16, which is a simple and quickly connected snap hook 17 and ring 18. Next, the operator grasps both ends of the cable 12 and raises them to a position generally as shown in Figure 3. The fact that the coupling 31 is not yet fastened permits a sufficient amount of slack in the face chains 14 and 15 so that they may be brought up on the outside of the wheel even though the coupling 16 is connected. The coupling 20 may then be quickly connected by inserting the head 23 into the enlarged opening 28 of the slot 24, as shown in Figure 3. With the coupling 20 connected the operator may then give a slight toss upward and inward and the weight of the chain assembly 11 will pull this cable 12 into a position in contact with the inner side wall of the tire 55. The weight of the tire chain assembly will then be borne by the cross chains 45, which engage the upper part of the tread 47. The operator may next grasp the lower outer ends of the face chains 14 and 15 and pull them downward and together to fasten the third coupling 31. This third coupling 31 may be connected in an adjustable length since the second pivoted plate 35 may be looped through any one of the links of the face chain 15. This will provide an adjustment so that the tire chain assembly may be fastened to the wheel 48 for different conditions of wear of the tread 47. The assembly will then appear as generally shown in Figure 4.

It will be noted that the tire chain assembly is easily and quickly mounted on the wheel while the wheel is in place on the axle of the vehicle and without jacking up the vehicle or the wheel and without moving the wheel forward or backward. Further, the operator does not need to reach under the vehicle since all couplings are fastened while at the outer front of the wheel 48.

The tire chain assembly 11 may be readily removed from the wheel 48. The operator may stop the vehicle with the tire chain in the position shown in Figure 4. The couplings may then be disengaged in reverse order, namely, disconnecting the coupling 31, pulling on the cross chains 45 to reach and disconnect the coupling 20, then disconnecting the coupling 16.

The tire chain assembly also may be readily removed from the wheel by having the operator stop the vehicle when the coupling 16 is positioned approximately one hundred thirty-five degrees counterclockwise of that position shown in Figure 4. This means that it will be approximately in the lower left hand quadrant of the wheel 48, when the front of the vehicle is to the right. The operator may readily determine this position since the coupling 16 is a very simple and small coupling as distinguished from the coupling 31. The operator next disengages the first coupling 16, which loosens the entire tire chain assembly 11. Next, he may pull toward him on the adjacent cross chain 56 until the coupling 20 is in view. This coupling is relatively rotatable; and since the tire chain assembly 11 is loose, the head 23 may be quickly disengaged from the slot 24. Next, the operator may drive the vehicle forward or backward to drive the wheel 48 off the chain assembly 11. Thus, the chain assembly may be removed from the wheel 48 even more quickly than it is mounted thereon.

The spacing between the cross chains 57 is preferably greater than the spacing between the remaining cross chains 45, or between the cross chains 56 in order that the chain when being mounted, as shown in Figure 4, will have sufficient spread between these cross chains 57 so that they will encompass the portion of the tread 47 which rests on the ground.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An antiskid device for use in conjunction with a wheel having a tire with a tread portion and inner and outer side portions, said antiskid device comprising a single one piece flexible wire rope having first and second ends and adapted to contact one side portion of said wheel, connecting means to connect the two ends of said wire rope into one annular face member of a fixed length having a peripheral length less than the outer periphery of said tire, said connecting means comprising a head member and an eye member, said head member being coaxial with said wire rope and fixedly connected to one of said ends of said wire rope, said eye member being fixedly attached to the other of said ends of said wire rope, said head member insertable into said eye member wherein said ends of said wire rope are held from axial movement and are capable of arcuate movement with respect to each other, first and second link chains adapted to be serially connected together at the ends thereof to form an annular chain member of adjustable length less than the outer periphery of said tire and adapted to contact the side portion of said wheel, first and second groups of a plurality of cross chains, said first group extending between said first chain and a first portion of said wire rope, said second group of cross chains extending between said second chain and a second portion of said wire rope, each said cross chain being clampingly and non-slidingly connected to said wire rope at one end of each cross chain only by a U-shaped end chain link having a bulk less than the bulk of the next adjacent individual link in said cross chains to which connected, each said cross chain being swivelably connected to one of said first and second link chains at the other end of each cross chain, first coupling means to interconnect in a fixed length said first and second link chains at a location adjacent said connecting means on said wire rope, and second adjustable length coupling means to interconnect the other ends of said first and second link chains at a location substantially diametrically opposite said first coupling means.

2. An antiskid device for use in conjunction with a wheel having a tire with a tread portion and inner and outer side portions, said antiskid device comprising a single one piece flexible wire rope having first and second ends and adapted to contact the inner side portion of said wheel, connecting means to connect the two ends of said wire rope into one annular face member of a fixed length having a peripheral length less than the outer periphery of said tire said connecting means comprising a head member and an eye member, said head member being coaxial with said wire rope and connected to one of said ends of said wire rope, said eye member attached to the other of said ends of said wire rope, said head member insertable into said eye member wherein said ends of said wire rope are held from axial movement and are capable of arcuate movement with respect to each other, first and second link chains adapted to be serially connected together at the ends thereof to form an annular face member having an adjustable peripheral length less than the outer periphery of said tire and adapted to contact the outer side portion of said wheel, first and second groups of a plurality of cross chains, said first group extending between said first chain and a first portion of said wire rope, said second group of cross chains extending between said second chain and a second portion of said wire rope, each cross chain being clampingly and non-slidingly connected to said wire rope only by a U-shaped end chain link having a weight less than the weight of the next adjacent link in said cross chain to which connected, first non-adjustable coupling means to interconnect in a fixed length said first and second link chains at a location adjacent said connecting means on said wire rope, second adjustable length coupling means to interconnect the other ends of said first and second link chains at a location substantially diametrically opposite said first coupling means, the spacing between the individual cross chains within said groups being less than the spacing between the closest cross chains of first and second groups adjacent said second coupling means.

3. The method of applying an antiskid assembly to a tire of a wheel while the wheel is journalled at the inner end of the hub thereof to a frame with the tire having a portion of the tread resting on a supporting surface, wherein the antiskid assembly has an inner relatively stiff whip-like face member with a first coupling and has first and second flexible face members connectable by second and third couplings to form an outer face member with all face members interconnected by cross members, said method comprising the steps of unfastening all couplings, swinging the entire antiskid assembly in a whip-like motion generally horizontal with the supporting surface to whip the far end of the assembly around behind the wheel so that the far end is brought into position in front of the wheel, maneuvering the relatively stiff face member to straighten out any kinks or twists in the assembly, fastening together said second coupling, raising the two ends of the stiff face member above the center of the wheel, fastening together said first coupling, pushing said stiff face member over the top of the tire so that the cross members at the upper portion of the assembly rest on the tread of the tire with the stiff face member annularly contacting the inner face of the tire, and fastening said third coupling.

4. The method of applying a chain assembly to a tire of a wheel while the wheel is journalled at the inner end of the hub thereof to a frame with the tire having a portion of the tread resting on a supporting surface, wherein the chain assembly has an inner relatively stiff whip-like face member with only a single coupling and has first and second face chains connectable by second and third couplings to form an outer face member with cross members interconnecting all face members, said method comprising the steps of unfastening all couplings, grasping the chain assembly by one end, swinging the entire chain assembly in a whip-like motion generally horizontal with the supporting surface to whip the far end of the chain assembly around behind the wheel so that the far end is brought into position in front of the wheel with said first and second face chains nearest the portion of the tread which rests on the supporting surface and with said relatively stiff whip-like face member farthest from the portion of the tread which rests on the supporting surface, maneuvering the relatively stiff face member to straighten out any kinks or twists in the chain assembly, fastening together said second coupling, grasping the two ends of said stiff face member, raising the two ends of the stiff face member above the center of the wheel, fastening together said first coupling, pushing said stiff face member over the top of the tire so that the cross members at the upper portion of the chain assembly rest on the tread of the tire with the stiff face member annularly contacting the inner face of the tire, grasping the two face chains near the outer lower ends thereof, and fastening said third coupling to secure said chain assembly about said tire.

5. The method of applying a chain assembly to a tire of a wheel while the wheel is journalled at the inner end of the hub thereof to a frame with the tire having a portion of the tread resting on a supporting surface, wherein the chain assembly has an inner relatively stiff whip-like face member with only a single coupling and has first and second face chains connectable by second and third couplings to form an outer face member with all face members interconnected by cross chains, said first and second couplings being non-adjustable in length and positioned between the same pair of cross chains, and the third coupling being positioned generally diametrically opposite said second coupling and being adjustable in length, said method comprising the steps of unfastening all couplings, grasping the chain assembly by one end, positioning oneself adjacent and facing the wheel, swinging the entire assembly in a whip-like motion generally horizontal and parallel with the supporting surface to whip the far end of the chain assembly around behind the wheel so that the far end is brought into position in front of the wheel with said first and second face chains nearest the portion of the tread which rests on the supporting surface and with said relatively stiff whip-like face member farthest from the portion of the tread which rests on the supporting surface, maneuvering the relatively stiff face member to straighten out any kinks or twists in the chain assembly, fastening together said second coupling, grasping the two ends of said stiff face member, raising the two ends of the stiff face member above the center of the wheel, fastening together said first coupling, pushing said stiff face member over the top of the tire so that the cross chains at the upper portion of the chain assembly rest on the tread of the tire with the stiff face member annularly contacting the inner face of the tire, grasping the two face chains near the outer lower ends thereof, pulling relatively tight said face chains, and fastening said face chains at said third coupling in an adjustable annular length to secure said chain assembly about said tire.

References Cited in the file of this patent

UNITED STATES PATENTS

| | | |
|---|---|---|
| 1,963,939 | Dodge | June 19, 1934 |
| 1,989,217 | Sisk | Jan. 29, 1935 |
| 2,252,778 | Morss | Aug. 19, 1941 |
| 2,572,045 | McLean | Oct. 23, 1951 |
| 2,574,579 | McCoy | Nov. 13, 1951 |